(12) United States Patent
Channning

(10) Patent No.: US 6,341,623 B1
(45) Date of Patent: Jan. 29, 2002

(54) VARIABLE ORIFICE, PRESSURE COMPENSATED AUTOMATED FUEL JET PUMP

(75) Inventor: Derek Albert Channing, Livonia, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/648,924

(22) Filed: Aug. 25, 2000

(51) Int. Cl.⁷ .............................. F02M 37/04; F04F 5/48
(52) U.S. Cl. ................... 137/565.22; 123/514; 417/189
(58) Field of Search ............ 137/565.22; 417/187, 417/189; 123/514

(56) References Cited

U.S. PATENT DOCUMENTS

| | | | |
|---|---|---|---|
| 384,666 A | 6/1888 | Young et al. | |
| 1,636,919 A | * 7/1927 | Miller | ......................... 137/505 |
| 2,457,388 A | * 12/1948 | Lung | ......................... 417/189 X |
| 2,812,715 A | 11/1957 | Redding et al. | |
| 2,855,861 A | * 10/1958 | Miles et al. | ............. 417/189 X |
| 2,935,029 A | * 5/1960 | Miles | ...................... 417/187 X |
| 2,953,156 A | 9/1960 | Bryant | |
| 4,411,239 A | * 10/1983 | Kelch | ..................... 123/514 X |
| 4,735,554 A | 4/1988 | Phillips, II | |
| 4,838,307 A | 6/1989 | Sasaki et al. | |
| 4,872,438 A | * 10/1989 | Ausiello et al. | ............. 123/514 |
| 5,024,583 A | 6/1991 | Sasaki et al. | |
| 5,070,849 A | 12/1991 | Rich et al. | |
| 5,082,426 A | 1/1992 | Sasaki et al. | |
| 5,289,810 A | 3/1994 | Bauer et al. | |
| 5,732,684 A | 3/1998 | Thompson | |
| 5,809,975 A | * 9/1998 | Tuckey et al. | .......... 123/514 X |
| 5,873,348 A | * 2/1999 | Fuchs et al. | ................. 123/514 |
| 5,918,578 A | * 7/1999 | Oda | ....................... 123/514 X |
| 5,941,279 A | 8/1999 | Frank et al. | |
| 5,979,485 A | 11/1999 | Tuckey et al. | |

* cited by examiner

*Primary Examiner*—John Rivell
(74) *Attorney, Agent, or Firm*—Carlos Hanze

(57) ABSTRACT

An automotive vehicle fluid jet pump 7 is provided including a first chamber 340 having a rear end 348 sealed from a front end 344 by a pressure communicative boundary 352. The first chamber front end 344 has an inlet 332 fluidly connected with a source of pressurized fluid. The first chamber front end 344 also has a nozzled outlet 372. A second chamber 376 is provided having a first inlet fluidly connected with the first chamber outlet 372. The second chamber 376 has a second inlet 380 fluidly connected with a sump. The second chamber has a delivery outlet 334. A valve member 400 is operatively associated with the first chamber boundary 352 for controlling a flow from the first chamber inlet 332 through said first chamber outlet 372. A position of the valve member 400 with respect to said first chamber outlet 372 is responsive to a pressure differential between the first chamber front end 344 and rear end 348.

13 Claims, 6 Drawing Sheets

VARIABLE ORIFICE, PRESSURE COMPENSATED AUTOMATED FUEL JET PUMP

FIELD OF THE INVENTION

The present invention relates to fuel tank jet pumps, which are used in an automotive vehicle, to transfer fuel from a fuel supply tank, to a fuel tank conditioning reservoir, prior to delivery to the vehicle fuel system. In particular, the variable orifice, pressure compensated jet pump of the present invention maintains close to peak operating efficiency in situations where the fluid viscosity range is broad, or where the driving flow rate varies significantly.

BACKGROUND OF THE INVENTION

Conventional jet pumps used for automotive applications are usually of the fixed orifice type. When used with fluids having a narrow viscosity range, as well as a supply pressure with minimal variation, the jet pump will have a flow rate also with minimal variation. Minimal flow rate variation maintains an almost constant velocity in the driving fluid jet. The above-noted properties enable conventional jet pumps to be designed to operate in a narrow range, at reasonable efficiency.

Jet pumps are typically used to maintain fuel in a fuel tank conditioning reservoir (commonly referred to as a fuel delivery module) inside the fuel tank, just prior to fuel delivery to the vehicle fuel system. Jet pumps may also be used to transfer fuel from a secondary fuel tank to a main fuel tank or from a secondary fuel reservoir to a main reservoir, in multi sump or saddle-type fuel tanks.

Jet pumps are normally driven by a fuel bleed from a fuel feed pump system. This fuel feed pump system typically has minimal variation in pressure, as well as having more than adequate flow capacity for the main fuel system, such that excess flow can be taken to drive the jet pump(s). Where fuel feed pump capacity is marginal, the fuel returned from the fuel system may be used to drive the jet pump(s), but occasionally with some loss in peak efficiency, due to the possible fuel return line flow variation.

If the fixed orifice jet pump is used with fluids having a broad viscosity range (due to fluid composition variations or variations in fluid temperature), the efficiency variation of the jet pump will be much greater. Also, using a fixed orifice jet pump on a fuel return system, where the fluid flow rate can vary significantly, may cause excessive system back pressure, unless a pressure relief valve is added.

It is desirable to provide a variable orifice, pressure compensated jet pump which will not only prevent the excessive back pressure, but will adjust the orifice to handle the variation in flow and viscosity, maintaining a near constant driving fluid velocity, which will keep the fuel jet pump working close to its peak efficiency.

It is additionally desirable to provide a variable orifice, pressure compensated fuel jet pump which can be used with the fuel system return flow driving the jet pump, even if the flow varies significantly, while controlling (limiting) the back pressure in the fuel return line.

SUMMARY OF THE INVENTION

To make manifest the above delineated and other desires, the revelation of the present invention is brought forth. In a preferred environment, the present invention provides a diesel powered automotive vehicle fuel system which includes a fuel tank with multiple control volumes. The fuel tank has a first control volume or fuel module and a second control volume. A first source of pressurized diesel fuel typically provided by an injector servo return, high pressure pump coolant fuel return, or a branch line from the fuel feed pump is connected with a pressurized fuel supply line having an outlet. The outlet of the pressurized fuel supply line is fluidly connected with a first chamber. The first chamber has a rear end which is sealed from a front end by a spring-biased diaphragm. The front end of the first chamber has a nozzled outlet. A second chamber is provided opposite the first chamber having an inlet in fluid communication with the first chamber outlet. The second chamber has an outlet fluidly connected with the first control volume. The second chamber also has an inlet fluidly connected with the second control volume. The first and second chambers cooperate to provide a jet pump to deliver diesel fuel from the second control volume to the first control volume. A valve member operatively associated with the spring-biased diaphragm is fixably connected thereto. The valve member has a head which gives the nozzle of the first chamber a variable opening orificed area. The valve member by virtue of its connection with the diaphragm, is sensitive to pressure differentials between the first chamber front end and the first chamber rear end. The rear end of the first chamber is exposed by fluid connection with the second volume. Accordingly, the valve member functions to maintain an approximate constant fuel flow velocity through the nozzle of the first chamber. Accordingly, efficiency of the jet pump is maintained regardless of the fuel viscosity and flow rate that is delivered to the first chamber via the pressurized fuel source.

Not only is the efficiency of the jet pump maintained over various viscosity ranges of the diesel fuel, but the back pressure of the system can be held sufficiently that low back pressure tolerant injector fuel returns associated with high pressure common rail diesel injection systems can be utilized to provide the pressurized fuel source.

It is a feature of the present invention to provide an automotive vehicle fuel system having a jet pump to deliver fuel from a second control volume to a first control volume utilizing a jet pump which is pressure compensated.

It is also a feature of the present invention to provide an automotive vehicle fuel system having a saddle tank with a jet pump to deliver fuels with variable viscosity, such as diesel fuel, from a secondary control volume to a first control volume of the fuel tank. The system utilizes a pressure compensated jet pump which automatically adjusts to maintain the fuel velocity through the jet pump at a constant velocity to maintain the efficiency of the jet pump during various changes in the fuel viscosity.

The above-noted features and other advantages of the present invention will become more apparent to those skilled in the art as the invention is further explained in the accompanying drawings and detailed description.

DETAILED DESCRIPTION OF THE INVENTION

Figure 1:
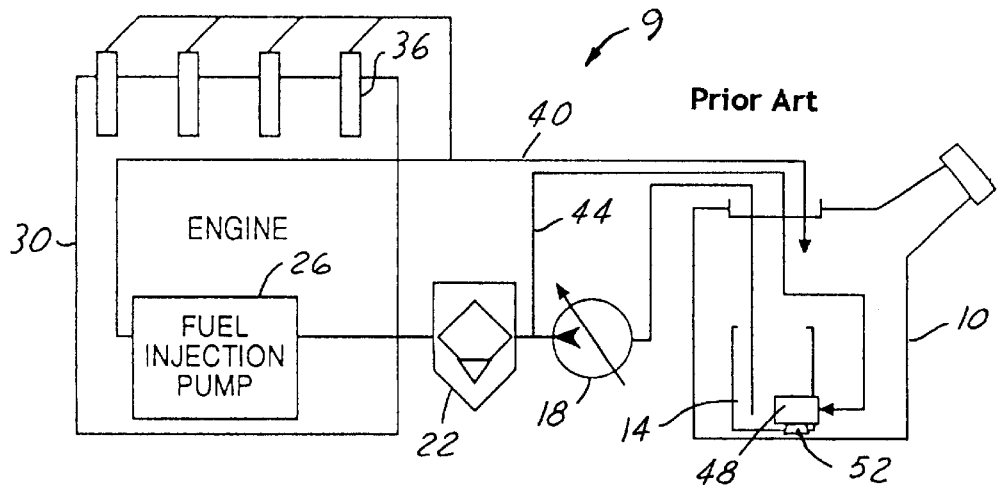
FIG. 1 is a schematic view of an automotive vehicle fuel system that utilizes a jet pump powered by a bleed of a fuel feed pump.

A vehicle fuel system 9, shown in FIG. 1, includes a fuel tank 10. The fuel tank has a first control volume provided by a fuel delivery module 14 and a second control volume provided by a remainder of the tank 10. The vehicle fuel system 9 also includes a fuel feed pump 18, fuel filter 22, fuel injection pump 26, mounted to the engine 30, fuel injectors 36, with a fuel return line 40 from the fuel injection pump 26 and fuel injectors 36, carrying excess fuel back to the fuel tank 10.

Assuming that the fuel feed pump 18 has excess capacity, a fuel line 44 from the delivery side of the feed pump 18 delivers fuel to a fuel delivery module 14. A jet at pump 48 draws fuel from the main tank 10 to keep the fuel delivery module 14 full of fuel. Under vehicle transient operating conditions, where the fuel supply in the fuel tank 10 may move away from a jet pump pick up point or sump 52, the module 14 will continue to deliver a continuous flow of fuel to the vehicle fuel system 9, free of air or vapor, until the adverse vehicle operating condition is concluded.

Figure 2:
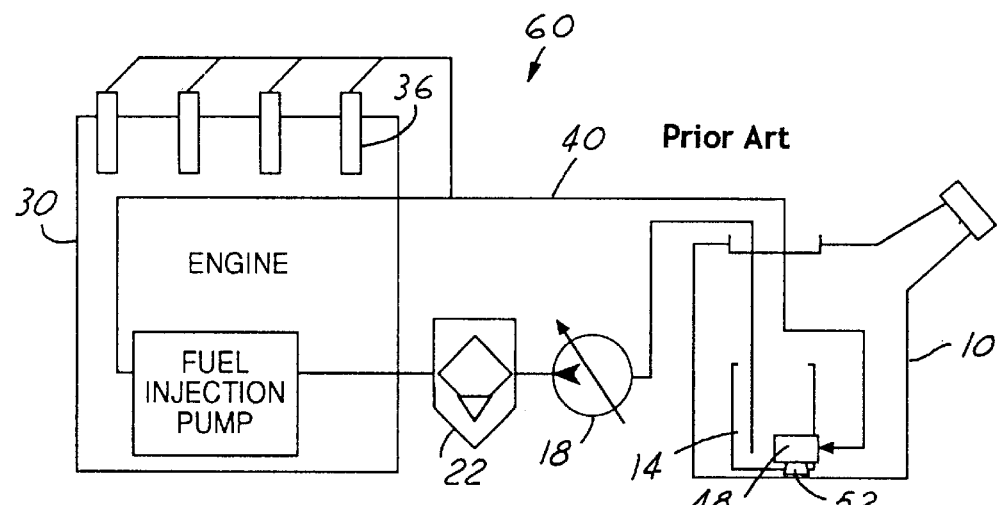
FIG. 2 is a schematic view of an automotive vehicle fuel system that utilizes a jet pump powered by fuel injection equipment return fuel flow.

FIG. 2 shows a similar vehicle fuel system 60 with similar items being given like reference numerals. In fuel system 60, the fuel feed pump 18 may have marginal capacity to support the fuel injector 36. In fuel system 60, the fuel injection equipment (FIE) return flow is used to drive the jet pump 48 directly. The disadvantage of this system 60 is that the variable return fuel flow from the fuel injection equipment will cause the fixed orifice jet pump 48 to work at a broad flow range, not always at jet pump 48's designed peak efficiency.

Figure 3:
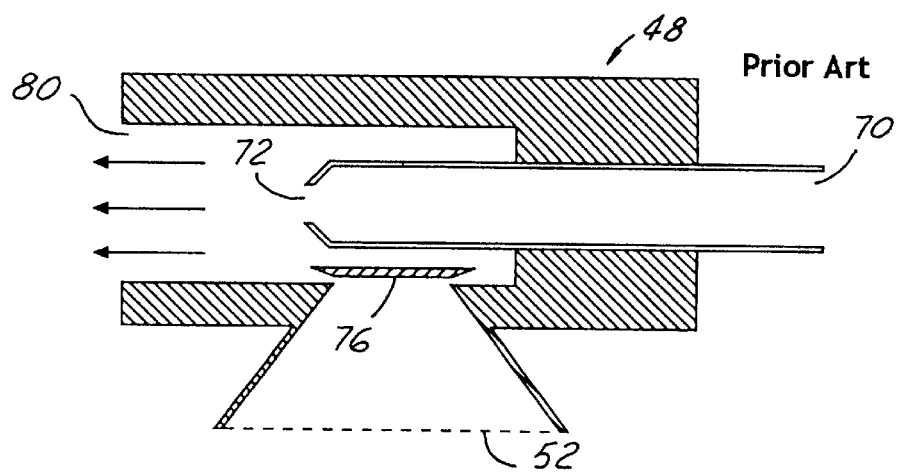
FIG. 3 is a schematic view of a jet pump shown in FIGS. 1 and 2 prior to the present invention.

FIG. 3 shows a typical prior art, fixed orifice jet pump 48. The jet pump 48 has an inlet 70 and a fixed orifice nozzled outlet 72. The jet pump 48 has a pick up point 52 provided by suction inlet. The jet pump 48 has a check valve 76 to prevent reverse flow through the suction inlet 52. Finally, the jet pump 48 has an outlet 80 fluidly connected with the fuel delivery module 14.

The disadvantage of both systems 9, 60, shown in FIGS. 1 and 2, is that if a fluid with a broad viscosity range is being used, then the fixed orifice jet pump 48 flow will vary, again causing the jet pump 48 to operate at less than its designed peak efficiency.

Figure 4:
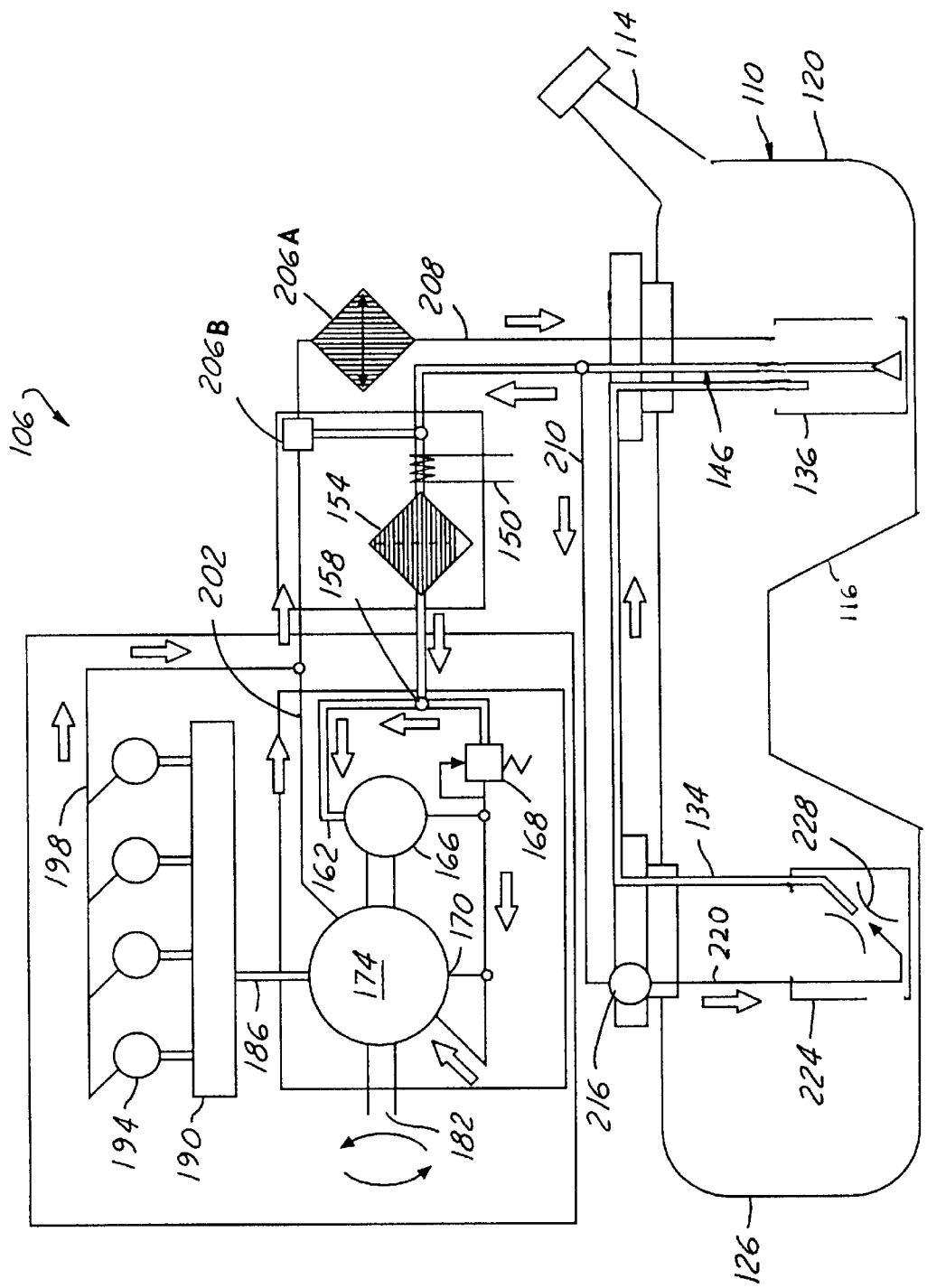
FIG. 4 is a schematic view of an automotive vehicle fuel system with a saddle tank having a prior jet pump for delivery of fuel from a second reservoir to a first reservoir.

Referring to FIG. 4, a diesel powered automotive vehicle with a fuel system 106 is shown. The fuel system 106 has a saddle fuel tank 110 with a fuel inlet line 114. The fuel tank 110 has an inward extending hump 116 to allow the fuel tank to be positioned in a vehicle above a component of the vehicle drive train. The fuel tank 110 has a main or first reservoir 120 providing a first control volume. The fuel tank 110 also has a second control volume or reservoir 126. The second reservoir 126 is connected with the first reservoir 120 via a first line 134. The first reservoir 120 has a fuel delivery module 136. The fuel delivery module 136 is connected by a line 146. The line 146 if required is heated by a heater 150. The line 146 then passes through a fuel filter 154. The diesel fuel then proceeds to a tee connection 158 and then through a connecting line 162. The line 162 feeds into an inlet for a feed pump 166. The feed pump 166 has its output regulated by a pressure regulator 168. The feed pump 166 delivers a high volume of pressurized diesel fuel to an inlet 170 of a high-pressure pump 174. A portion of the fuel is utilized to cool the high-pressure pump 174. The high-pressure pump 174 and the feed pump 166 are both engine powered by a rotating shaft 182. The high-pressure pump via a line 186 feeds pressurized diesel fuel into a high-pressure common rail 190. The high-pressure common rail 190 is fluidly connected with a plurality of injectors 194. The injectors 194 fluidly communicate excess diesel fuel to an injector servo return line 198. The injector servo return line 198 is teed into a high-pressure coolant fuel return line 202. The line 202 is run through a temperature diverter 206B which thermally communicates with the fuel filter 154. The aforementioned line 202 can also pass through an optional fuel cooler 206A and is thereinafter returned to the first sump 120 via a line 208. A line 210 is teed off of the line 146 and is fed to an inlet of an electric pump 216. The electric pump 216 has a pressurized fuel outlet line 220 which is fed into a jet pump module 224 having a jet pump 228. The jet pump 228 can be similar in design and/or function to the aforementioned jet pump 48 (FIGS. 1–3). The outlet of the jet pump 228 is fluidly connected with an inlet of the aforementioned first line 134. The jet pump 228 which is powered by the electric pump 216 delivers fuel from the second reservoir 126 to the first reservoir 120. This fuel system 106 has an electric pump (that is typically relatively expensive) due to the sensitivity of the injectors 194 which typically must have a low back pressure in the injector servo return line 198 to properly function. Accordingly, the aforementioned line 210 is teed off from the line 146 and an electric pump 216 is utilized to operate the aforementioned jet pump 228.

Again, the vehicle fuel system 106 suffers from the same inefficiencies in the operation of its jet pump 228 as that previously mentioned in regard to the jet pump 48 in FIGS. 1–3.

Figure 5:
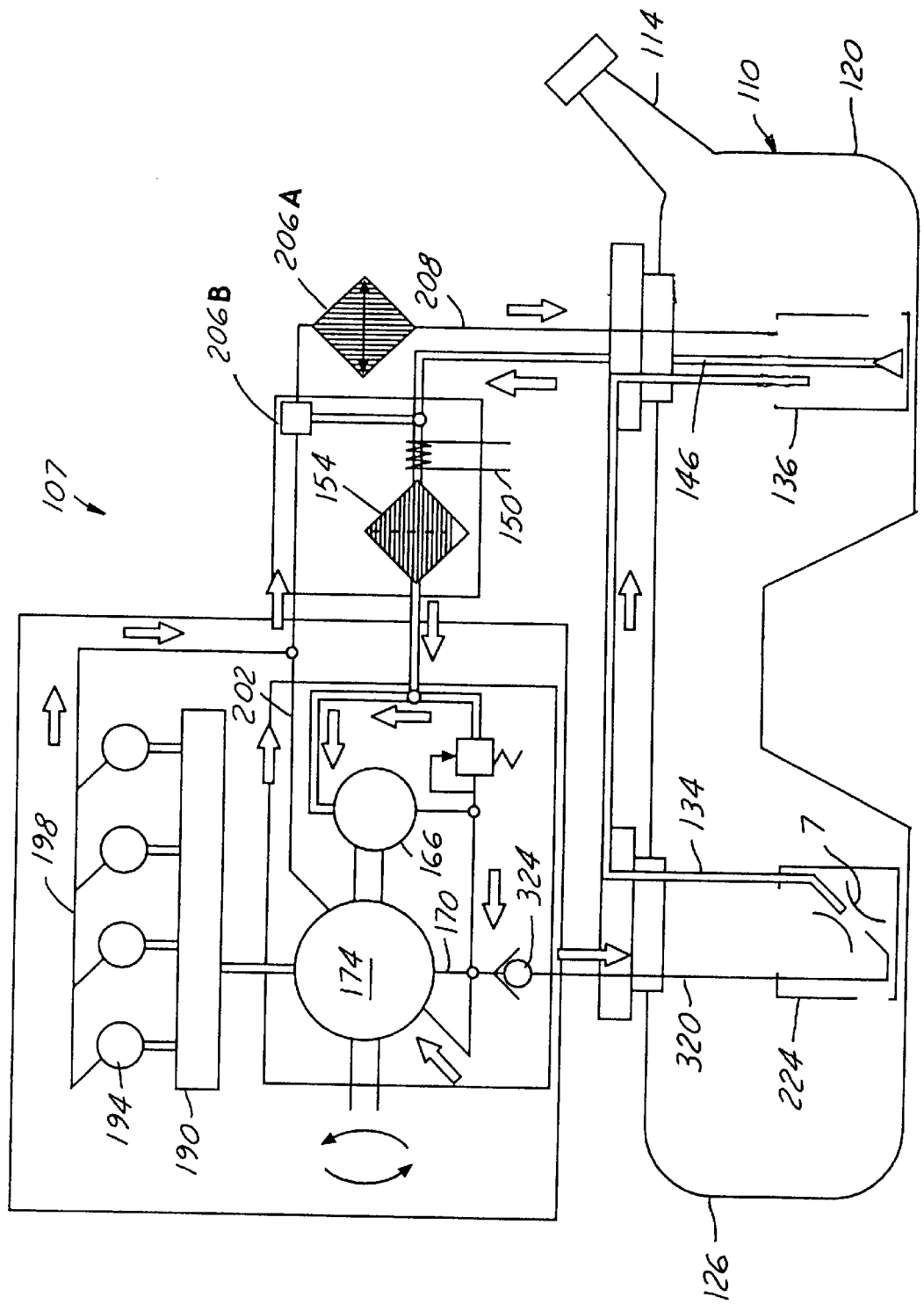
FIG. 5 is a schematic view of an automotive vehicle fuel system similar to that shown in FIG. 4 with a jet pump according to the present invention.

Referring to FIG. 5, a jet pump 7 of the present invention is provided. The automotive fuel system 107 has a teed off line 320 which is fed by the feed pump 166. The line 320 has inserted therein a loaded check valve 324.

Figure 6:
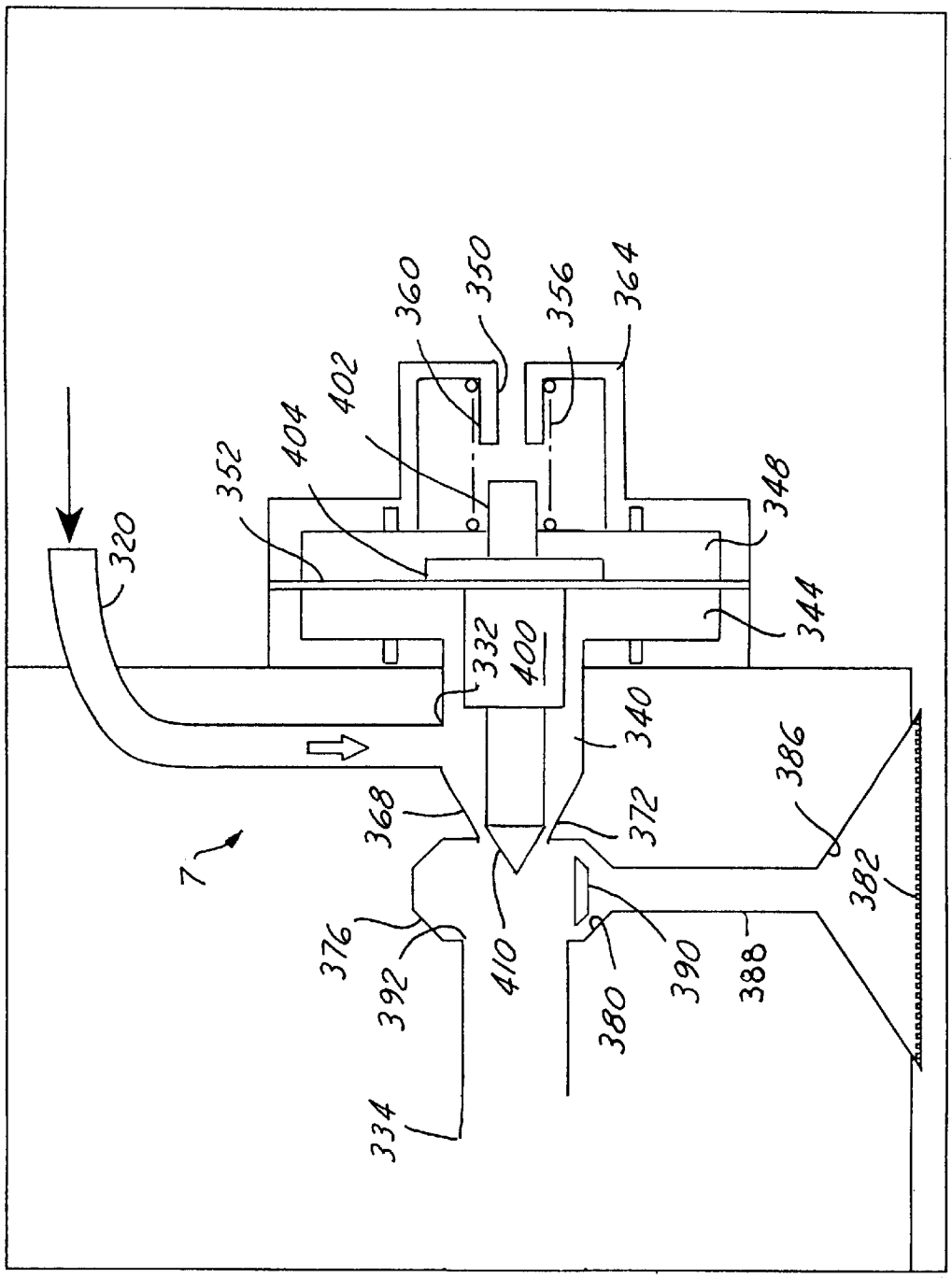
FIG. 6 is an enlarged schematic view of an automotive vehicle fuel jet pump of the present invention.

Referring additionally to FIG. 6, the line 320 in a similar manner is connected to a jet pump 7. The use of the variable orifice, pressure compensated jet pump 7, described in this invention will enable fuel systems 9, 60, 107 to operate near peak jet pump efficiency, using either a variable return flow, or variable viscosity fuel (or both), to drive the jet pump 7.

Reviewing FIG. 6 in detail, the fuel injection equipment (FIE) return flow or fuel pump pressurized fuel supply is delivered to the jet pump assembly 7 via a line 320. The line 320 has an outlet 332 which is also the inlet of a first chamber 340. The first chamber 340 has a front end 344 sealingly divided from a rear end 348 by a pressure boundary 352. The pressure boundary 350 is a pressure communicative diaphragm which is responsive to the pressure differential between the first chamber front portion 344 and rear end portion 348. In an embodiment (not shown) the pressure boundary can be supplied by a piston. In the embodiment shown, the diaphragm 352 is spring biased by a biasing spring 356. The biasing spring 356 is mounted by a stud 360 which is part of a housing 364 which defines the rear end portion of the first chamber 340 and the major portion of the front end portion of the first chamber 340. In an embodiment (not shown), the diaphragm can be deformed to additionally incorporate the function of the spring 356. The first chamber rear end 348 is exposed by fluid connection with the fuel tank 10 (in fuel systems 9, 60) or with the second reservoir fuel delivery module 136 (in fuel system 107).

The front end of the first chamber 340 forms a converging nozzle 368 having an outlet 372. The outlet 372 serves as an inlet for a second chamber 376. The second chamber 376 has a second inlet 380 fluidly connected with the fuel tank 10 (fuel systems 9, 60) or the second reservoir 126 (fuel system 107) via a filter membrane 382 and a converging nozzle 386 and a line 388 and a check valve 390. The second chamber has an outlet 392 which is fluidly connected with the fuel delivery module 14 (in fuel system 9, 60) or with the first line 134 in fuel system 107.

The front end of the first chamber 340 forms a converging nozzle 368 having an oulet 372. The outlet 372 serves as an inlet for a second chamber 376. The second chamber 376 has a second inlet 380 fluidly connected with the fuel tank 10 (fuel systems 9, 60) or the second reservoir 126 (fuel system 107) via a filter membrane 382 and a converging nozzle 386 and a line 388and a check valve 390. The second chamber has an outlet 392 which is fluidly connected with the fuel delivery module 14 (in fuel system 9, 60) or with the first line 134 in fuel system 107.

Fixably connected to the diaphragm 352 is a valve member 400. The valve member 400 has a stud 402 which mounts is a forward end of the aforementioned spring 356. The valve member 400 is connected on the diaphragm 352 by a collar 404 and is accordingly operatively associated with the diaphragm 352. The valve member 400 translates fore and aft to generally regulate the fuel flowing from the line 320 to the second chamber 376 via the outlet 372 of the first chamber 340. The valve member 400 has a generally conical metering head 410. In response to the differential between the pressure in the front end of the first chamber front end 344 and rear end 348, the valve member 400 moves fore and aft creating a variable orifice to maintain the fuel velocity of the diesel fuel exiting the outlet 372 at a generally constant level to maintain peak efficiency of the jet pump 7.

In operation, in instances where the diesel fuel viscosity is relatively high the valve member 400 will be pushed rightward as shown in FIG. 6 to increase the orificed area of the outlet 372. In cases where the fuel viscosity is lower, the spring 360 will urge the valve member 400 forward (leftward) to maintain the velocity of the fuel, leaving the first chamber exit 372 at its approximate optimum designed velocity level. As well as regulating the fuel pressure driving the jet pump 7, valve member 400 varies the orificed area so that the higher the fuel flow (in line 320), the larger the orificed area will be. The above-noted positioning of the valve member 400 will have the effect of controlling the fuel velocity from the first chamber outlet 372, maintaining the jet pump efficiency close to its optimum design due to variations in pressure of fuel supply or fuel mass flow rate fluctuations. Again, the pressure compensation positioning of the valve member 400 increases the efficiency of the jet pump 7 utilized to deliver fuel from the fuel tank 10 to the fuel delivery module 14 (in fuel systems 9, 60) or from second reservoir 126 to the first reservoir 120 (in fuel system 107).

The jet pump spring-loaded diaphragm 352 and valve member 400 can also be used to regulate the fuel pressure of feed pump 18 (in fuel system 9) and pump 166 (in fuel system 107). The spring-loaded diaphragm 352 of jet pump 7 also acts as a pressure regulator, to prevent excessive FIE return flow back pressure in the fuel system of FIG. 6.

Figure 8:
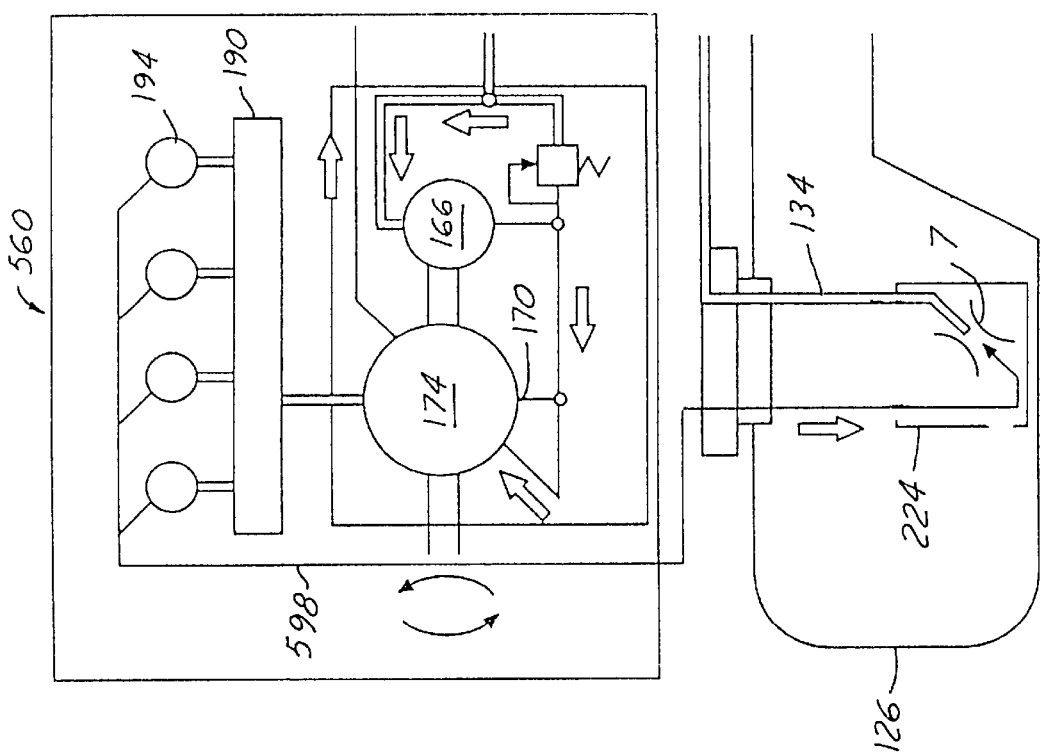
FIG. 8 is a partial schematic view of an automotive vehicle fuel system that is an alternative to that shown in FIG. 5 wherein a high pressure pump coolant fuel return line is utilized as a source of pressurized fuel for powering a jet pump. The coolant fuel return shown in FIG. 7 and the injector servo fuel return shown in FIG. 8 can also be combined to power the jet pump 7.
Figure 7:
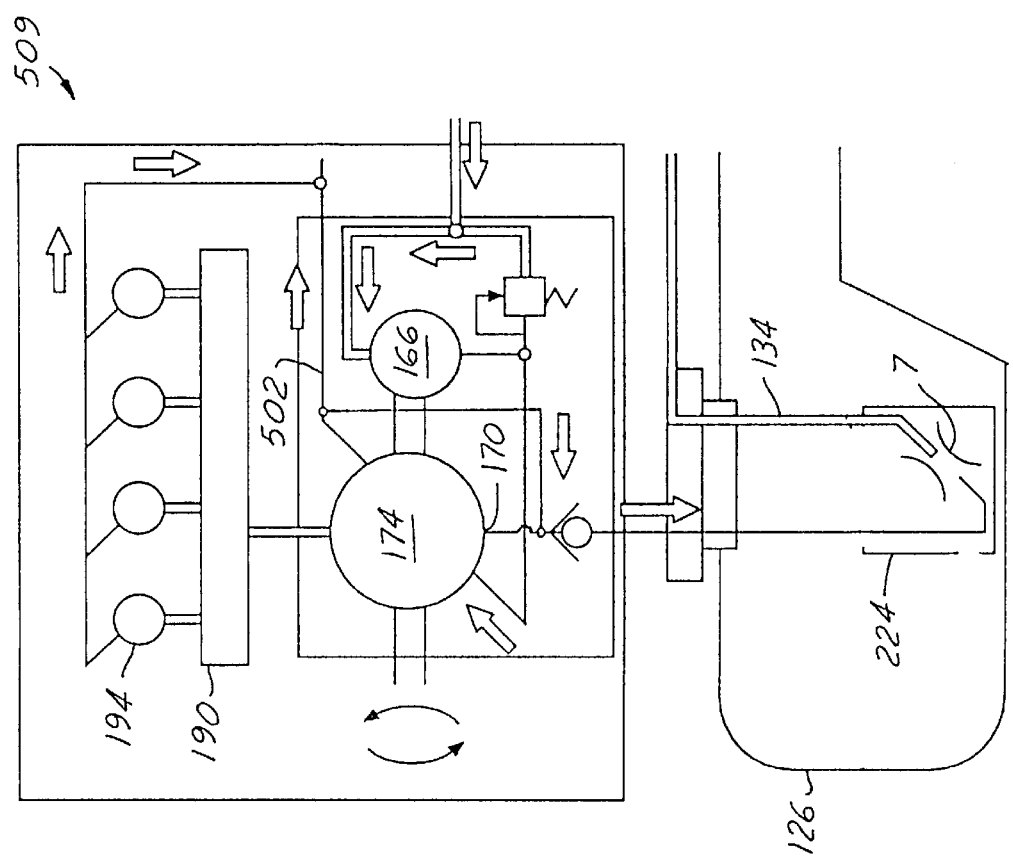
FIG. 7 is a partial schematic view of an automotive vehicle fuel system that is an alternative to that shown in FIG. 5 wherein an injector servo fuel return line is utilized as a source of pressurized fuel for powering a jet pump.

In the automotive fuel system 509 shown in FIG. 7, the jet pump 7 is fed from the high-pressure pump coolant fuel return line 502. In the automotive fuel system 560 of the invention shown in FIG. 8, the jet pump 7 is powered by the injector servo return line 598. The coolant fuel return shown in FIG. 7 and the injector servo fuel return shown in FIG. 8 can also be combined to power the jet pump 7.

Figure 9:
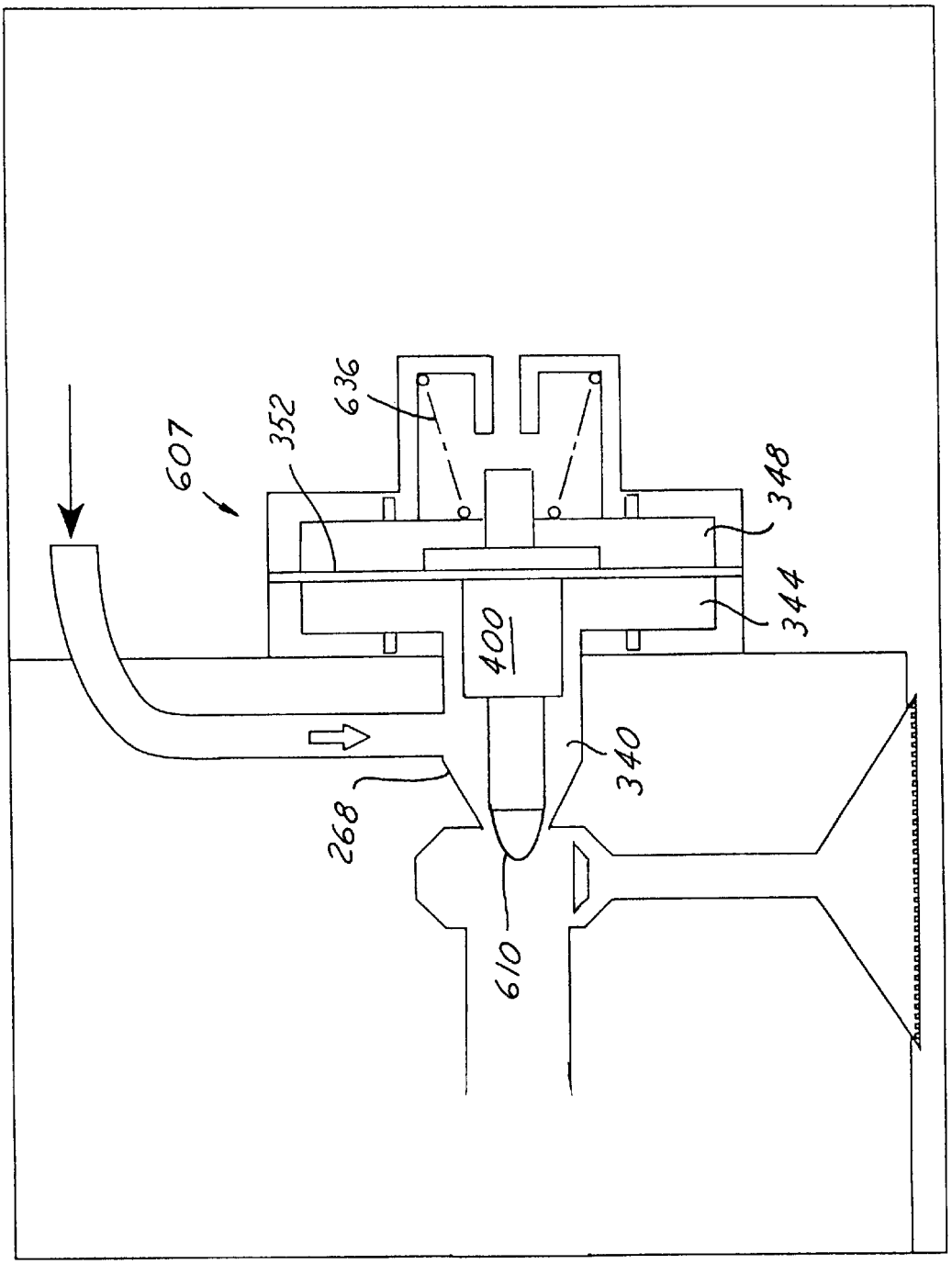
FIG. 9 is a schematic view of a jet pump that is an alternative to that shown in FIG. 6 wherein the jet pump has a valve member with a non-conical head and a diaphragm biased by a non-constant rate spring.

Referring to FIG. 9, an alternative preferred embodiment jet pump 607 of the present invention has a diverging coil spring 636 to provide a non-linear spring constant and a non-conical head 610 on the valve member 400. The non-constant spring rate and non-conical head can be modified to meet the demands of the particular fuel system application.

While preferred embodiments of the present invention have been disclosed, it is to be understood that they have been disclosed by way of example only and that various modifications can be made without departing from the spirit and scope of the invention as it is encompassed by the following claims.

I claim:
1. An automotive vehicle fuel system comprising:
   a fuel reservoir having a first control volume and a second control volume;
   a first source of pressurized fuel connected with a pressure supply line having an outlet;
   a first chamber having a rear end sealed from a front end by a pressure communicative boundary, said first chamber front end having an inlet fluidly connected with said pressure supply line outlet, said chamber front end having a nozzled outlet;
   a second chamber having a first inlet fluidly connected with said first chamber outlet, said second chamber having a second inlet fluidly connected with said second control volume, said second chamber having an outlet fluidly connected with said first control volume; and
   valve member operatively associated with said first chamber pressure boundary for controlling a flow from said first chamber inlet through said first chamber outlet, a position of said valve member with respect to said first chamber outlet being responsive to a pressure differential between said first chamber front end and rear end.

2. An automotive vehicle fuel system as described in claim 1 wherein said pressure communicative boundary is provided by a diaphragm and said valve member is connected with said diaphragm.

3. An automotive vehicle fuel system as described in claim 1 wherein said rear end of said first chamber is fluidly connected with said second control volume.

4. An automotive vehicle fuel system as described in claim 1 wherein there is a check valve preventing reverse flow from said first chamber into and through said pressurized supply line.

5. An automotive vehicle fuel system as described in claim 1 wherein said first and second control volumes are located in a saddle fuel tank separated from one another by a hump.

6. An automotive vehicle fuel system as described in claim 1 wherein said valve member functions to provide a constant fuel velocity through said first chamber outlet.

7. An automotive vehicle fuel system as described in claim 1 wherein in addition there is a check valve preventing flow from said first control volume to said second control volume via said second chamber second inlet.

8. An automotive vehicle comprising:

an engine for powering said vehicle, said engine having a plurality of injectors;

a first fuel reservoir having first and second control volumes;

a first source of pressurized fuel connected with a pressurized fuel line having an outlet;

a first chamber having a rear end sealed from a front end by a pressure communicative boundary, said first chamber front end having an inlet fluidly connected with said pressurized fuel line, said first chamber having an nozzled outlet;

a second chamber having a first inlet fluidly connected with said first chamber outlet, said second chamber having a second inlet fluidly connected with said second control volume, said second chamber having an outlet fluidly connected with said first control volume; and a valve member for controlling a flow of fuel from said second line through said first chamber outlet, said valve member being operatively associated with said first chamber boundary, a position of said valve member with respect to said first chamber outlet being responsive to a pressure differential between said first chamber front and rear ends.

9. An automotive vehicle is described in claim 8 wherein said vehicle is a diesel powered vehicle and wherein said pressure boundary is a diaphragm and said diaphragm is biased by a spring and wherein said first chamber rear end is exposed to said second control volume wherein said valve member operates to control the velocity of said fuel traveling from said pressurized fuel line through said first chamber outlet to a generally constant velocity.

10. An automotive vehicle is described in claim 8 wherein said first and second control volumes are in a saddle tank.

11. An automotive vehicle is described in claim 8 wherein said source of pressurized fuel is from a feed pump.

12. An automotive vehicle as described in claim 8 wherein said source of pressurized fuel is an injector fuel return.

13. An automotive vehicle as described in claim 8 wherein said first control volume is a fuel delivery module and said second control volume is a fuel tank.

\* \* \* \* \*